United States Patent [19]

Leinen

[11] Patent Number: 5,758,689
[45] Date of Patent: Jun. 2, 1998

[54] CONTROL VALVE WITH PARTIAL FLOW DIFFUSER

[75] Inventor: Chris M. Leinen, Austin, Tex.

[73] Assignee: Forward Spin Consulting, Inc., Austin, Tex.

[21] Appl. No.: 764,043

[22] Filed: Dec. 12, 1996

[51] Int. Cl.$^6$ .................................................. F16K 5/10
[52] U.S. Cl. ........................... 137/625.32; 251/127; 138/40
[58] Field of Search ........................ 137/625.3, 625.31, 137/625.32; 251/127; 138/39, 40

[56] References Cited

U.S. PATENT DOCUMENTS

| | | | |
|---|---|---|---|
| 1,333,048 | 3/1920 | Webster . | |
| 3,443,793 | 5/1969 | Hulsey | 251/209 |
| 3,636,983 | 1/1972 | Keyser | 138/39 |
| 3,665,965 | 5/1972 | Baumann | 138/42 |
| 3,826,281 | 7/1974 | Clark | 137/625.31 |
| 3,880,191 | 4/1975 | Baumann | 137/625.32 |
| 3,941,350 | 3/1976 | Kluczynski | 251/127 |
| 3,960,177 | 6/1976 | Baumann | 137/625.31 |
| 3,974,860 | 8/1976 | Stead et al. | 137/625.3 |
| 4,212,321 | 7/1980 | Hulsey | 137/625.32 |
| 4,226,263 | 10/1980 | Muchow | 137/614.17 |
| 4,295,632 | 10/1981 | Engelke | 251/127 |
| 4,364,415 | 12/1982 | Polon | 137/625.32 |
| 4,427,030 | 1/1984 | Joursma | 138/40 |
| 4,479,510 | 10/1984 | Bey | 137/625.31 |
| 4,540,025 | 9/1985 | Ledeen et al. | 137/625.32 |
| 4,691,894 | 9/1987 | Pyotsia et al. | 251/127 |
| 4,774,984 | 10/1988 | Peters | 237/625.32 |
| 4,889,163 | 12/1989 | Engelbertsson | 137/625.31 |
| 5,070,909 | 12/1991 | Davenport | 137/625.32 |
| 5,116,019 | 5/1992 | Rohweder et al. | 251/127 |
| 5,193,583 | 3/1993 | Gethmann et al. | 137/625.32 |
| 5,287,889 | 2/1994 | Leinen | 137/625.3 |
| 5,437,305 | 8/1995 | Leinen | 137/625.32 |
| 5,511,584 | 4/1996 | Leinen | 137/625.3 |

FOREIGN PATENT DOCUMENTS

| | | |
|---|---|---|
| 1050164 | 8/1953 | France . |
| 23 52 370 | 4/1975 | Germany . |
| 23 59 717 | 6/1975 | Germany . |
| 26 54 769 | 6/1978 | Germany . |

OTHER PUBLICATIONS

Bulletin No. Lot 1, 25000 Series, LO-T Control Valve, H.D. Baumann Assoc. Ltd.
Spec. Sheet SDCN30000 Series Control Valve Brochure, Neles-Jamesbury, The Unique Rotary Control Valve.

Primary Examiner—John Fox
Attorney, Agent, or Firm—Pravel, Hewitt, Kimball & Krieger

[57] ABSTRACT

A partial diffuser is provided in a flow path of a pipe or valve, dividing the flow path into an unrestricted flow region, a greater restricted flow region, and a lesser restricted flow region. The flow path is defined by an inside wall, and the lesser restricted flow region is proximate to the inside wall. The greater restricted flow region is distal to the inside wall, and the lesser restricted flow region lies between the greater restricted flow region and the inside wall. In one embodiment three partial diffusers project into the flow path in a ball valve. An inlet flow diffuser is installed in the inlet to the valve, and a valve element inlet flow diffuser is installed at an inlet to a valve element in the valve diametrically opposed to the inlet flow diffuser. A valve element outlet flow diffuser is installed in an outlet from the valve element at a position diametrically opposed to the valve element inlet flow diffuser. These partial flow diffusers reduce the formation of excess turbulence and vortices, thus reducing vibration and noise.

23 Claims, 4 Drawing Sheets

CONTROL VALVE WITH PARTIAL FLOW DIFFUSER

BACKGROUND OF THE INVENTION

1. Field of the Invention

The present invention relates to flow in pipes and control valves, and more particularly, to noise attenuation in a flow control valve using a partial diffuser.

2. Description of the Related Art

Flow control valves are used to regulate flow of fluid through pipes and pipelines. Flow control valves typically include a body having an inlet and an outlet and a valve element between. In a ball or plug-type valve, the inlet, outlet, and valve element have a bore for allowing flow through the valve. The bore in the valve element is selectively alignable with the bores in the inlet and outlet of the valve body for manipulating the effective size of the bore through the valve. At a high flow rate through the valve, the bore in the valve element is fully aligned with the bores in the inlet and outlet of the valve body. However, at a low flow rate, the bore in the valve element is substantially out of alignment with the bores in the valve inlet and valve outlet so as to restrict flow through the valve. At intermediate flow rates the bore in the valve element is aligned in an intermediate position.

When the bore in the valve element is out of alignment with the bores in the inlet and outlet of the valve body, the valve is in a throttling position restricting flow through the valve. The fluid inlet bore has a cross-sectional area, and when the valve is in a throttling position the ross-sectional area at the inlet to the bore through the valve element is less than the cross-sectional area of the valve inlet. Fluid accelerates through this reduced or restricted flow area into the valve element, and as the fluid accelerates it drops in pressure. Turbulence and vortices tend to form in the fluid downstream of the restricted flow area.

Portions of the fluid stream pass through the bore without being accelerated while other portions are accelerated and expanded. Shear occurs within the fluid stream where low velocity, high pressure portions of the fluid stream contact and mix with high velocity, low pressure portions. Fluid acceleration, deceleration and shear can cause vibration in the valve and pipe, creating noise and fatiguing the metal of the valve or pipe leading to premature failure.

Flow control valves introduce a pressure drop in a fluid stream, regulating flow by varying the pressure drop. Localized high-pressure drops cause vibration and noise problems. Diffusers have been used to spread the overall pressure drop through the valve to different portions of the valve. In U.S. Pat. No. 5,437,305, an inlet diffuser is placed in an inlet to a valve body. The inlet diffuser has a plurality of holes or a plurality of teeth or tines extending into an inlet bore. A portion of the pressure drop through the valve is taken across the inlet flow diffuser. Diametrically opposite the inlet flow diffuser, a valve passage inlet diffuser is placed which extends inwardly into a bore in a valve element. As the valve is throttled, the valve passage inlet diffuser meshes with the inlet passage diffuser to restrict flow through the valve. The pressure drop through the valve is further spread throughout the valve by including a valve passage outlet diffuser.

In U.S. Pat. No. 4,691,894 Pyötsiä, et al., a butterfly valve is shown fitted with attenuation plates having a plurality of holes. The butterfly valve has a bore defined by inside walls, with the attenuation plates mounted to the inside walls to project perpendicularly into the bore. A closing member such as a disk is provided that pivots within the bore between a first closed position and a second open position. The closing member has a section which rotates upstream, with the attenuation plates located downstream of that section. The holes in each attenuation plate are distributed evenly over the area of the attenuation member and are of equal size. This valve is subject to vibration and noise under certain conditions.

Although improvements have been made in valves to attenuate noise and vibration, there remains a need for a valve that can throttle flow while reducing vibration and noise. Thus, a need remains for a pressure reduction device in a conduit with reduced vibration and noise.

SUMMARY OF THE INVENTION

The present invention provides a partial diffuser disposed in a flow path of a flow pathway. The flow pathway has an inside wall, and the partial diffuser is mounted on the inside wall projecting into the flow path. The partial diffuser divides the flow path into an unrestricted flow region and a restricted flow region. The restricted flow region is subdivided into a lesser restricted flow region and a greater restricted flow region. The partial diffuser has a relatively large opening proximate to the inside wall and small or no openings distal to the inside wall. The lesser restricted flow region is associated with the large opening, and the greater restricted flow region is associated with the area having the small holes or no holes at all. The lesser restricted flow region lies between the inside wall and the greater restricted flow region. Flow through the lesser restricted flow region does not substantially contribute to total flow through the flow path, yet flow through the lesser restricted flow region provides sufficient flow to significantly reduce oscillating vortices from flow through the area of unrestricted flow, yielding reduced low frequency noise. Flow through the lesser restricted flow region mixes with flow through the unrestricted flow region and reduces the tendency to form vortices that may otherwise form and oscillate on the downstream side of the partial diffuser from flow through the unrestricted flow region past the greater restricted flow region.

In one embodiment, at least one partial diffuser is installed in a control valve. The control valve has a valve body, and the valve body has an inlet and an outlet. A valve element is provided in the valve body between the inlet and the outlet, and a bore provides an opening through the inlet, the valve element, and the outlet. The bore is defined by a wall and a partial diffuser is mounted on the wall, projecting into the bore. The partial diffuser divides the cross-sectional area of the bore into an unrestricted flow region and a restricted flow region. The restricted flow region includes a greater restricted flow region and a lesser restricted flow region. For the lesser restricted flow region, the partial diffuser has at least one relatively large opening proximate to the wall. The greater restricted flow area is distal to the wall. The lesser restricted flow region lies between the wall and the greater restricted flow region.

In another aspect, the present invention provides a flow control valve having at least one partial diffuser for attenuating vibration and noise when the valve is in a throttling position. In a preferred embodiment an inlet flow diffuser is installed in an inlet to a control valve proximate to a valve element. A valve element inlet flow diffuser is provided at an inlet to a valve element in the valve diametrically opposed to the inlet flow diffuser. A valve element outlet flow diffuser is installed in an outlet from the valve element at a position diametrically opposed to the valve element inlet flow diffuser. The partial diffusers channel flow through the control valve, distributing the pressure drop and reducing vibration and noise in the valve.

BRIEF DESCRIPTION OF THE DRAWINGS

A better understanding of the present invention can be obtained when the following detailed description of the preferred embodiments is considered in conjunction with the following drawings, in which.

DETAILED DESCRIPTION OF THE PREFERRED EMBODIMENTS

Figure 1:
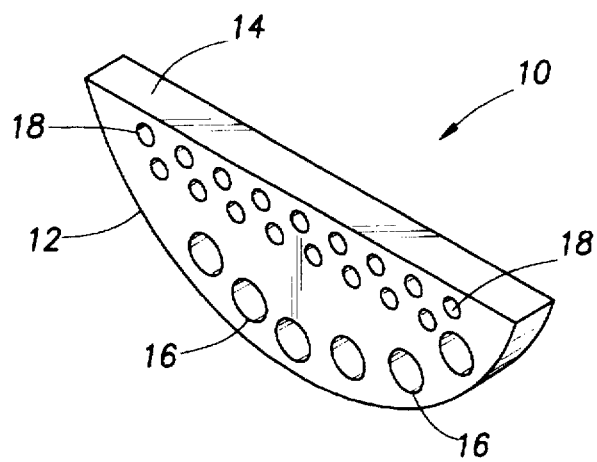
FIG. 1 is a perspective view of a partial diffuser according to the present invention.

With reference to FIG. 1, a partial diffuser 10 is shown in a perspective view, according to the present invention. Partial diffuser 10 is shown as having a semicircular shape with a wall side 12 and an opposing side 14. In this typical embodiment, partial diffuser 10 would fit inside a pipe or valve, and wall side 12 would be welded to or otherwise engaged with an inside wall of the pipe or valve. Partial diffuser 10 has a plurality of large holes 16 that offer very little restriction to flow passing through partial diffuser 10. These large holes 16 would be proximate to the inside wall of the pipe or valve in which partial diffuser 10 is placed. Partial diffuser 10 also has a plurality of small holes 18 that restrict fluid flowing through partial diffuser 10, the restriction being greater than that provided by large holes 16. Small holes 18 allow some fluid to flow therethrough, but small holes 18 restrict the flow through partial diffuser 10 rather severely. Small holes 18 could be eliminated entirely. The operation of partial diffuser 10 is further discussed below in conjunction with FIG. 3

Figure 2:
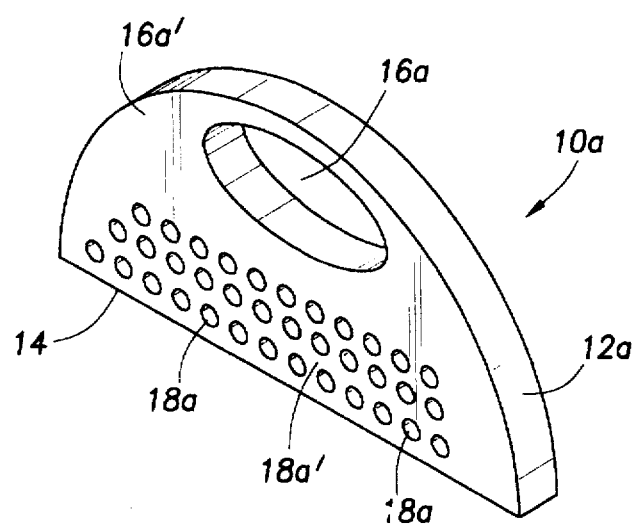
FIG. 2 is a perspective view of an alternative embodiment of a partial diffuser.

With reference now to FIG. 2, an alternative partial diffuser 10a is shown in perspective view, according to the present invention. Partial diffuser 10a is shown ready for fabrication into a circular conduit. Thus, partial diffuser 10a has a wall side 12a and an opposing side 14a. In this embodiment, partial diffuser 10a has a single large hole 16a for providing a flow path through partial diffuser 10a. Small holes 18a provide an alternate flow path through partial diffuser 10a, but small holes 18a restrict flow more than does large hole 16a.

Figure 3:
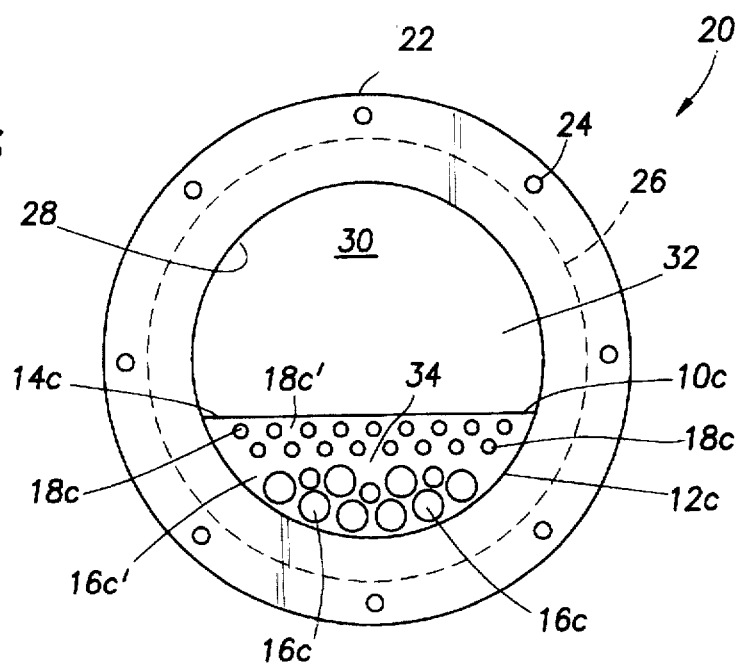
FIG. 3 is an end view of a pipe having a partial diffuser according to the present invention.

Turning now to FIG. 3, an end view of a pipe 20 having a partial diffuser 10c is shown according to the present invention. Partial diffuser 10c reduces the pressure of a fluid flowing through pipe 20. The purpose of partial diffuser 10c is to reduce fluid pressure without creating vibration and its associated noise. Partial diffuser 10c can be similar to partial diffuser 10 or 10a. The pipe 20 includes a flange 22 having bolt holes 24. An end 26 of the pipe 20 is shown in dashed lines behind flange 22. Partial diffuser 10c has a wall side 12c and an opposing side 14c. Pipe 20 has an inside wall 28, and wall side 12c is welded to inside wall 28.

Pipe 20 has a bore 30 for flow of a fluid. Partial diffuser 10c projects perpendicularly into bore 30 from inside wall 28. Partial diffuser 10c has a plurality of large holes 16c and a plurality of small holes 18c where the small holes 18c more than the large holes 16c restrict flow through bore 30.

Bore 30 provides a flow path for a fluid flow through pipe 20. Partial diffuser 10c divides this flow path, bore 30, into an unrestricted flow area 32 and a restricted flow area 34. Restricted flow area 34 is the area encompassed by partial diffuser 10c, while unrestricted flow area 32 is that portion of bore 30 where partial diffuser 10c does not project. Fluid passing through bore 30 can pass through unrestricted flow area 32 without encountering an obstacle, but fluid passing through restricted flow area 34 must pass through holes 16c or holes 18c. Restricted flow area 34 is subdivided into a lesser restricted flow region 16c' associated with large holes 16c and a greater restricted flow region 18c' associated with small holes 18c. Lesser restricted flow region 16c' is closer to inside wall 28 than is greater restricted flow region 18c'. In the various embodiments of the partial diffuser of the present invention the lesser restricted flow region, where the larger holes are, is closer to the pipe wall than is the greater restricted flow region.

Unrestricted flow region 32 provides a clear and unobstructed flow path for fluid to flow through bore 30. Unrestricted flow region 32 is typically a major portion of the cross-sectional area of bore 30, while restricted flow region 34 is typically a lesser portion. However, these portions may vary for a particular application. If it is desired that restricted flow region 34 take a significant pressure drop, then restricted flow region 34 can be a major portion of bore 30.

Greater restricted flow region 18c' can be a total restriction in which there would be no small holes 18c. The size, number and configuration of holes 16c or 18c can be varied, but in any case flow is greater through lesser restricted flow region 16c' than through greater restricted flow region 18c'. Due to frictional effects, there is the possibility that small holes 18c can have a greater cross-sectional area than large holes 16c; however, flow through small holes 18c is less than the flow through large holes 16c. In one embodiment the area of unrestricted flow 32 is at least 40% of the total cross-sectional area of bore 30; the area of restricted flow 34 is at most 60% of the total cross-sectional area of bore 30, and the area of lesser restricted flow region 16c' is at most 30% of the area of restricted flow.

Fluid flows through unrestricted area 32 in relatively streamlined fashion, except near opposing side 14c. The velocity of fluid flowing through unrestricted area 32 adjacent to opposing side 14c is reduced due to a frictional effect between the fluid and opposing side 14c. This velocity reduction causes the portion of fluid flowing adjacent opposing side 14c to curve toward wall side 12c. If holes 16c and 18c were not present or were of equal size, then a vortex, an eddy current, or swirling motion would tend to form proximate to the downstream side of partial diffuser 10c. This vortex would tend to form where fluid passing through unrestricted area 32 near opposing side 14c would angle towards inside wall 28 in the vicinity of large holes 16c.

A problem associated with vortex formation is vibration and its associated noise, the noise being a nuisance and the vibration being a potential cause of metal fatigue. The problem arises when the vortex itself moves and oscillates, as this sets up a low frequency vibration within pipe 20. This low frequency vibration can cause metal fatigue in pipe 20 leading potentially to failure as well as causing an unacceptably high noise level.

A diffuser according to the present invention reduces this effect. By providing fluid flow through large holes 16c, the tendency to form a vortex on the downstream side of partial diffuser 10c is reduced, and even when a vortex does form, it tends not to oscillate against inside wall 28. Fluid passing through large holes 16c curves toward unrestricted area 32 on the downstream side of partial diffuser 10c. Fluid passing through large holes 16c encounters and mixes with fluid passing through unrestricted area 32, sweeping this fluid away from partial diffuser 10c, reducing the tendency to create a vortex downstream of partial diffuser 10c. Lesser restricted flow region 16c' is sized to pass a small, but sufficient, amount of flow so as to at least partially cancel fluid forces tending to establish a vortex proximate to the downstream side of partial diffuser 10c. Although some vortex formation at the downstream side of partial diffuser 10c is acceptable and probably unavoidable, flow through lesser restricted flow region 16c' must be sufficient to at least educe the tendency of a vortex to oscillate, as it is the oscillation of a vortex that causes vibration and noise.

Figure 3A:
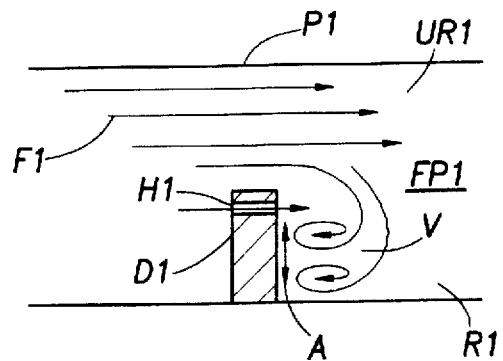
FIG. 3A is a side section of a prior art partial diffuser with lines illustrating flow pattern.
Figure 3B:
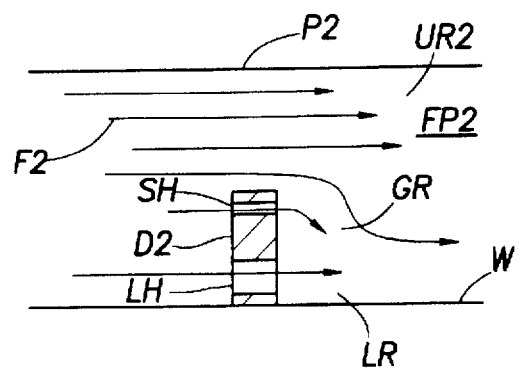
FIG. 3B is a side section of a partial diffuser according to the present invention.

Turning now to FIGS. 3A and 3B for further explanation, FIG. 3A illustrates a prior art diffuser D1 located in a pathway P1. Pathway P1 has a flow path FP1 through which a fluid F1 is flowing, fluid F1 having streamlines represented by lines with arrows indicating flow direction. FIG. 3B illustrates a partial diffuser D2 according to the present invention, where partial diffuser D2 is located in a pathway P2. Pathway P2 has a flow path FP2 through which a fluid F2 is flowing, fluid F2 having streamlines represented by lines with arrows indicating flow direction. Fluids F1 and F2 may be liquid, gas or a fluidized solid.

The prior art diffuser D1 has a single hole H1 (or a plurality of holes having a uniform size) through which a portion of fluid F1 flows. Diffuser D1 divides flow path FP1 into an unrestricted region UR1 and a restricted region R1, where restricted region R1 corresponds to a cross-sectional area of diffuser D1. As indicated by the streamlines, the flow of fluid F1 is slowed adjacent to diffuser D1, causing the streamlines to curve towards restricted region R1. Flow through unrestricted region UR1 is so much greater than flow through restricted region R1 that a vortex V forms downstream of diffuser D1. Under certain conditions vortex V can move and bounce (oscillate) transverse to the flow path FP1, as indicated by line and arrows A, causing vibration and noise. In addition to the noise being a nuisance, the vibration can cause fatigue resulting in failure of the pathway P1.

This problem is alleviated by a diffuser according to the present invention as illustrated in FIG. 3B. Partial diffuser D2 has a small hole SH and a large hole LH. Partial diffuser D2 divides flow path FP2 into an unrestricted flow region UR2, a lesser restricted flow region LR proximate to large hole LH and a greater restricted flow region GR proximate to small hole SH. Pathway P2 has an inside wall W that defines flow path FP2. Large hole LH is proximate to wall W, while small hole SH is distal to wall W. Thus, lesser restricted flow region LR is proximate to wall W, and greater restricted flow region GR is distal to wall W. Lesser restricted flow region LR lies between wall W and greater restricted flow region GR.

Partial diffuser D2 is analogous to a wind screen around a tennis court. A wind screen is provided around a tennis court to inhibit gusting and swirling of wind in the tennis court which interferes with ball flight. A gap is preferably left between the wind screen and the tennis court so that wind can pass below the wind screen. To a much lesser extent, wind passes through the wind screen. When a wind screen is arranged in this manner, a minimum amount of interference is experienced by a ball in flight. It is believed that this arrangement of the wind screen inhibits formation of wind vortices downwind of the wind screen, reducing air turbulence in the tennis court.

This principle has been applied in the present invention to fluid flow in a pathway. With reference to FIG. 3B, large hole LH is analogous to the gap between the wind screen and the tennis court. The unrestricted flow region UR2 corresponds to flow above the wind screen, greater restricted flow region GR corresponds to flow through the wind screen and lesser restricted flow region LR corresponds to flow below the wind screen. A wind screen on a tennis court works better if a gap exists between the wind screen and the tennis court than if no gap is left between the wind screen and the tennis court. Likewise, the partial diffuser D2 of the present invention works better than the diffuser of the prior art D1. A sufficient amount of flow F2 passes through large hole LH so that the formation of vortices downstream of partial diffuser D2 is inhibited, but at the same time flow through large hole LH is kept as low as possible so that the primary flow is through unrestricted flow region UR2. Flow F2 through unrestricted flow region UR2 mixes with flow through lesser restricted flow region LR so as to reduce a tendency to form a vortex downstream of partial diffuser D2. With little or no vortex formed in flow path FP2, vibration and noise is reduced, reducing a noise nuisance and a serious potential for failure. Although turbulence and vortex formation may not be entirely eliminated, they are at least minimized, and the size and instability of any resulting vortices or other turbulence is reduced.

To determine the cross-sectional area of partial diffuser D2 and the size (and number) of holes SH and LR, consideration is given to the cross-sectional area of the flow path FP2, pressure upstream of partial diffuser D2, desired pressure drop across partial diffuser D2, fluid flow rate and fluid properties. Holes SH and LH are sized sufficiently small so as to realize the desired pressure reduction in fluid F2. Large hole LR is sized as small as possible to minimize flow through lesser restricted flow region LR, but yet large enough to allow sufficient flow through lesser restricted flow region LR so as to reduce turbulence and the tendency of a vortex to oscillate on the downstream side of partial diffuser D2. Vortex oscillation is indicated by a low-frequency vibration, and an objective of the present invention is to eliminate this low-frequency vibration. Design of partial diffuser D2 is determined largely empirically, observing after installation whether the desired pressure drop has been achieved and whether an unacceptable vibration is present.

Figure 4:
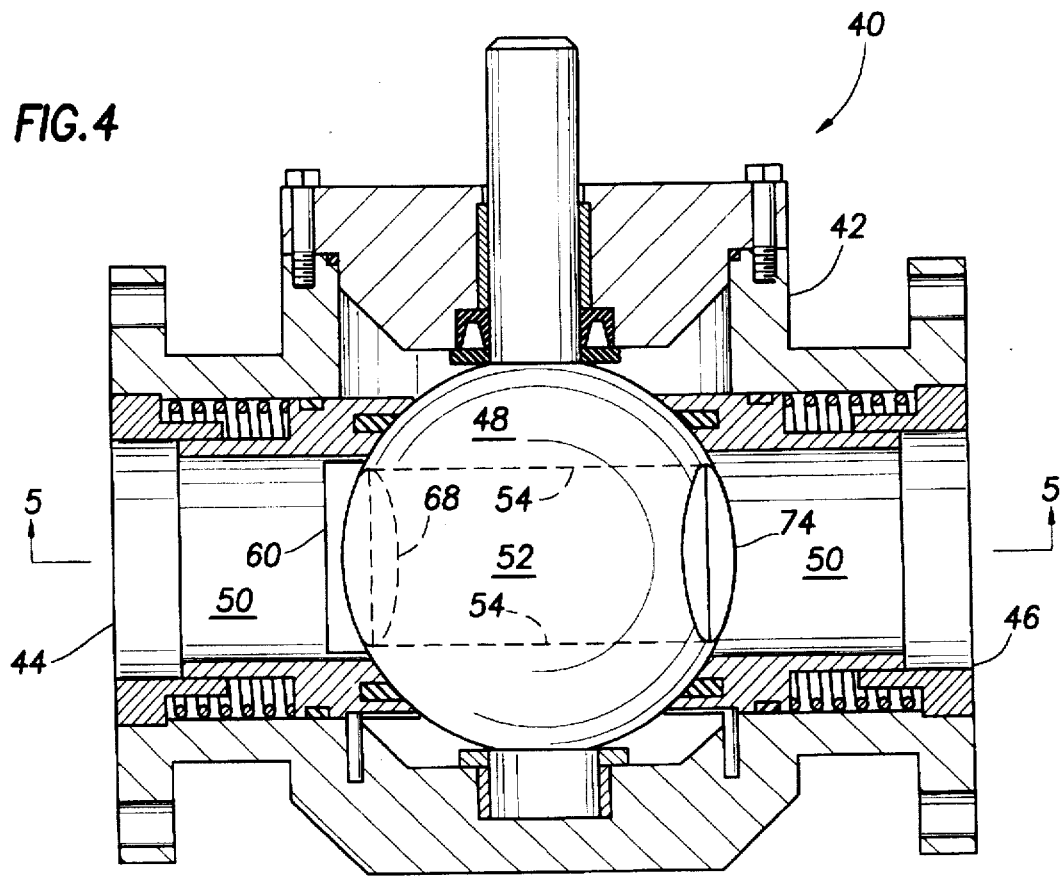
FIG. 4 is a cross section of a valve having partial diffusers according to the present invention.
Figure 5:
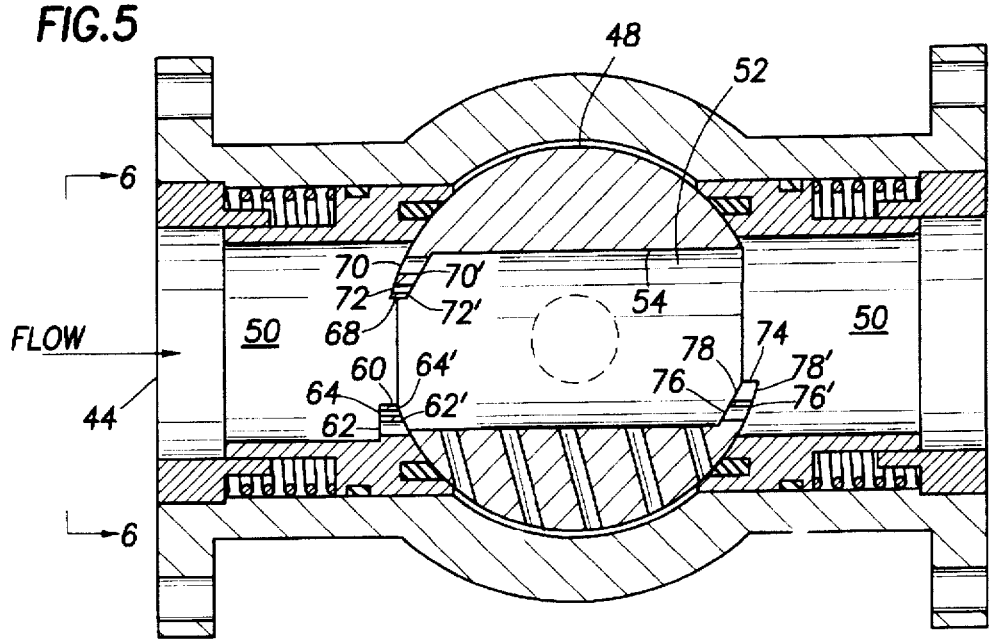
FIG. 5 is a cross section of the control valve of FIG. 4 as seen along the lines 5—5

Turning now to FIGS. 4 and 5, an additional embodiment of the present invention is illustrated. A cross-section of a ball valve 40 is shown in FIG. 4. Valve 40 has a valve body 42 which has an inlet 44, an outlet 46, and a valve element 48 between. Valve body 42 has an axial bore 50 providing an opening between inlet 44 and outlet 46. Valve element 48 has a bore 52 defined by inside wall 54. Bore 52 is selectively alignable with bore 50, ranging from a fully open position where bore 52 fully aligns with bore 50 to a fully closed position where bore 52 is fully out of alignment with bore 50, thereby closing off flow through valve 40. Valve element 48 can be held in an intermediate position, partially aligning bore 52 with bore 50 so as to regulate flow through valve 40. A valve such as valve 40 is fully explained in U.S. Pat. Nos. 5,287,889; 5,437,305; and 5,511,584; therefore, these patents are incorporated by reference in their entireties.

With reference to FIG. 5, a partial diffuser 60 is provided in inlet 44. Partial diffuser 60 has a plurality of large holes 62 and a plurality of small holes 64. The large holes 62 provide a lesser restricted flow region 62', and the small holes 64 provide a greater restricted flow region 64'. A partial diffuser 68 is provided at the inlet to bore 52 in valve element 48. Partial diffuser 68 has large holes 70 and small holes 72. Associated with large holes 70 is a lesser restricted flow region 70', and associated with small holes 72 is a greater restricted flow region 72'. A partial diffuser 74 is provided at the outlet of bore 52 on valve element 48. Partial diffuser 74 has large holes 76 and small holes 78. A lesser restricted flow region 76' is provided proximate to large holes 76, and a greater restricted flow region 78' is provided proximate to small holes 78. Valve 40 preferably has at least one of the partial diffusers 60, 68 or 74.

Figure 6:
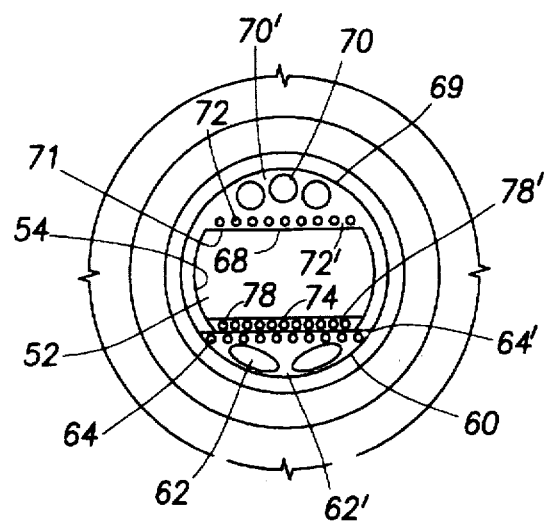
FIG. 6 is an end view of the valve of FIG. 4 as seen along the lines 6—6 in FIG. 5.

Turning now to FIG. 6, an end view of valve 40 is provided as would be seen along the lines 6—6 in FIG. 5. Partial diffuser 60 depicts an embodiment having two large holes 62 in lesser restricted flow region 62'. Greater restricted flow region 64' has a plurality of small holes 64, but rather than small holes, notches or some other type of restriction could be provided in partial diffuser 60.

Partial diffuser 68 illustrates another embodiment of a partial diffuser according to the invention. Partial diffuser 68 has three large holes 70 located proximate to wall 54. Partial diffuser 68 has a wall side 69 that is secured to wall 54 in valve element 48. Partial diffuser 68 has an opposing side 71 opposite wall side 69, and opposing side 71 projects into bore 52. Small holes 72 are located distal to wall 54 and proximate to opposing side 71. Lesser restricted flow region 70' is proximate to wall 54, while greater restricted flow region 72' is distal to wall 54. A portion of partial diffuser 74 is visible in FIG. 6 including small holes 78 and greater restricted flow region 78'.

Figure 7:
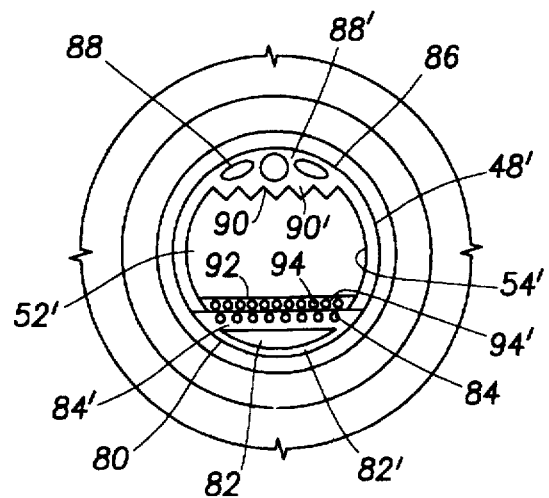
FIG. 7 is an end view of a valve showing alternative embodiments of partial diffusers.

Turning now to FIG. 7, some alternative embodiments of partial diffusers that could be used in valve 40 or in a conduit are illustrated. The view is the same as is shown in FIG. 6, but these are alternative embodiments not illustrated in FIG. 5. The valve illustrated in FIG. 7 has a valve element 48', and a bore 52' through element 48' is defined by walls 54'. A partial diffuser 80 is shown in the inlet of this valve. Partial diffuser 80 has a single large hole 82 and a lesser restricted flow region 82'. Large hole 82 is located near a wall, and small holes 84 are provided distal to the wall. The area surrounding small holes 84 defines a greater restricted flow region 84'.

A partial diffuser 86 is installed in the inlet to valve element 48'. A plurality of large holes 88 is provided proximate to wall 54', providing a lesser restricted flow region 88'. Partial diffuser 86 has a corrugated side 90, and corrugated side 90 serves the purpose of small holes. A greater restricted flow region 90' is provided proximate to corrugated side 90 and distal to wall 54'. A partial diffuser 92 having small holes 94 defining a greater restricted flow region 94' is provided at the outlet of valve element 48'. Corrugated side 90 could be replaced with a straight side, and greater restricted flow region 90' would still be distal to wall 54'. The lesser restricted flow region must lie between the wall and the greater restricted flow region, regardless whether the greater restricted flow region has a straight or a corrugated side or whether it has holes.

Figure 8:
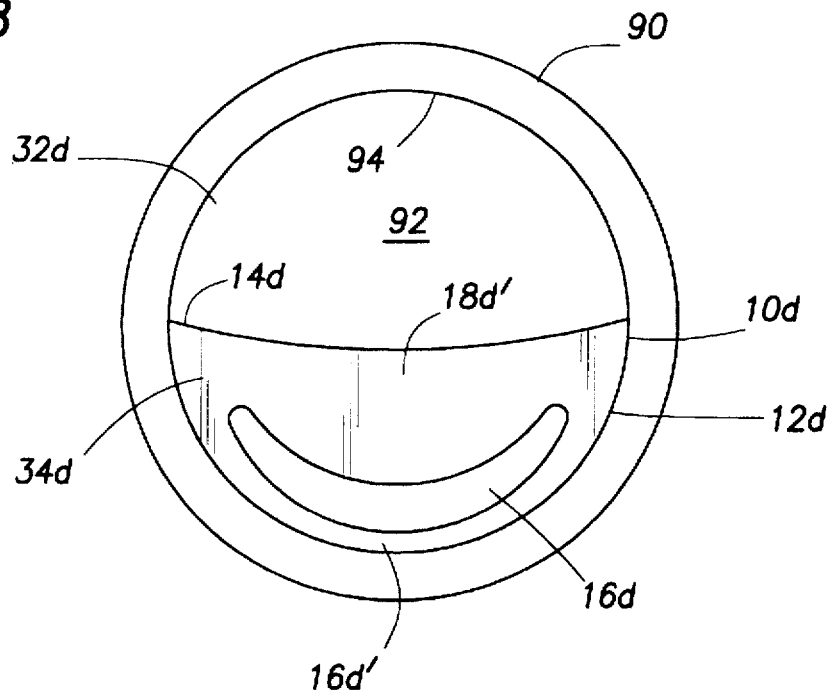
FIG. 8 is an end view of a pathway having a partial flow diffuser according to the present invention.
Figure 9:
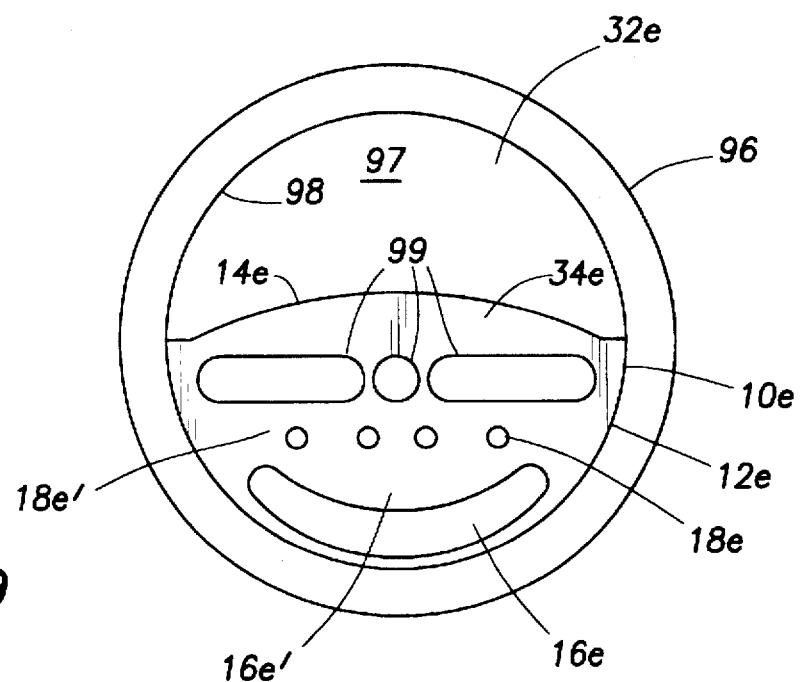
FIG. 9 is an end view of a pathway having an alternative embodiment of a partial flow diffuser.

FIGS. 8 and 9 illustrate alternative embodiments of the present invention. In FIG. 8 a pathway 90 has a flow path 92 defined by an inside wall 94. As illustrated in this end view, a partial diffuser 10d is secured to inside wall 94. Partial diffuser 10d divides flow path 92 into an unrestricted flow region 32d and a restricted flow region 34d. Partial diffuser 10d has a wall side 12d which matingly engages inside wall 94. Opposite wall side 12d partial diffuser 10d has a distal side 14d. Proximate to wall 94 partial diffuser 10d has a large hole 16d. Proximate to large hole 16d and to wall 94 is a lesser restricted flow region 16d'. Distal to wall 94 and to lesser restricted flow region 16d' is a greater restricted flow region 18d'. Lesser restricted flow region 16d' is between wall 94 and greater restricted flow region 18d'.

In FIG. 9 a pathway 96 is shown in an end view, and pathway 96 has a flow path 97 which is defined by an inside wall 98. A partial diffuser 10e having a wall side 12e is disposed in pathway 96. Partial diffuser 10e divides flow path 97 into an unrestricted flow region 32e and a restricted flow region 34e. Partial diffuser 10e has opening 16e proximate to inside wall 98. Small holes 18e are provided distal to inside wall 98. A greater restricted flow region 18e' exists proximate to small holes 18e. A lesser restricted flow region 16e' is located between greater restricted flow region 18e' and inside wall 98. Passages 99 are provided distal to pathway wall 98 relative to greater restricted flow region 18e'. Passages 99 provide an intermediate restricted flow region.

The foregoing disclosure and description of the invention are illustrative and explanatory thereof, and various modifications and alterations to the embodiments disclosed herein will be apparent to those skilled in the art in view of this disclosure. It is intended that all such variations and modifications fall within the spirit and scope of this invention as claimed.

What is claimed is:

1. An apparatus for reducing vibration and noise associated with a flow, comprising:

a pathway having a flow path, a cross-sectional area, and an inside wall; and a partial diffuser disposed within the pathway, wherein the partial diffuser divides the flow path in the pathway into areas of unrestricted and restricted flow, wherein the partial diffuser defines a greater restricted flow region and a lesser restricted flow region, wherein the lesser restricted flow region is between the inside wall and the greater restricted flow region, wherein the flow through the lesser restricted flow region does not substantially contribute to total flow through the flow path, and wherein the flow through the lesser restricted flow region provides sufficient flow to significantly reduce turbulence and vortices from flow through the area of unrestricted flow, yielding reduced low frequency noise.

2. The apparatus of claim 1, wherein the greater and lesser restricted flow regions have associated flow rates, and wherein the flow rate through the lesser restricted flow region is greater than the flow rate through the greater restricted flow region.

3. The apparatus of claim 1, wherein the area of unrestricted flow is at least 40 percent of the cross-sectional area, the area of restricted flow is at most 60 percent of the cross-sectional area, and wherein the lesser restricted flow region is at least 5 percent of the area of restricted flow.

4. The apparatus of claim 1, wherein flow through the lesser restricted flow region limits low frequency resonance caused by flow through the area of unrestricted flow past the partial diffuser.

5. The apparatus of claim 1, wherein the area of unrestricted flow is a generally clear path.

6. The apparatus of claim 1, wherein the greater restricted flow region has a lower flow capacity per unit area than the lesser restricted flow region.

7. The apparatus of claim 6, wherein the greater restricted flow region includes a higher percentage of obstructed area than the lesser restricted flow region.

8. The apparatus of claim 7, wherein the greater restricted flow region has at least 25 percent more obstructed area per unit area than the lesser restricted flow region.

9. The apparatus of claim 1 further comprising an intermediate restricted flow region between the greater restricted flow region and the area of unrestricted flow.

10. The apparatus of claim 1, wherein the pathway is a pipe.

11. The apparatus of claim 1, wherein the pathway is a valve element.

12. The apparatus of claim 11, wherein the partial diffuser is disposed in an inlet portion of the valve element.

13. The apparatus of claim 11, wherein the partial diffuser is disposed in an outlet portion of the valve element.

14. The apparatus of claim 1, wherein the pathway is a valve inlet.

15. The apparatus of claim 1, wherein the pathway is a valve outlet.

16. An apparatus for reducing vibration and noise associated with a flow, comprising:

a pathway having a flow path, a cross-sectional area, and an inside wall; and a partial diffuser disposed within the pathway, wherein the partial diffuser divides the flow path in the pathway into areas of unrestricted and restricted flow, wherein the partial diffuser defines a greater restricted flow region and a lesser restricted flow region, wherein the lesser restricted flow region is between the inside wall and the greater restricted flow region, and wherein the lesser restricted flow region is sized to allow a sufficient flow therethrough so that flow through the lesser restricted flow region mixes with flow through the area of unrestricted flow and reduces a tendency of the flow through the area of unrestricted flow to form excess turbulence and vortices proximate to the downstream side of the partial diffuser.

17. An apparatus for reducing vibration and noise associated with a flow, comprising:

a pathway having a flow path, a cross-sectional area, and an inside wall; and a partial diffuser disposed within the pathway, wherein the partial diffuser divides the flow path in the pathway into areas of unrestricted and restricted flow, wherein the partial diffuser defines a greater restricted flow region and a lesser restricted flow region, and wherein flow through the lesser restricted flow area mixes with flow through the area of unrestricted flow downstream of the partial diffuser and reduces a tendency for the flow through the area of unrestricted flow to form excess turbulence and vortices proximate to the downstream side of the partial diffuser, the lesser restricted flow area being sized to provide a substantially minimum flow required to negate the tendency for excess turbulence and vortex formation so that vibration and noise is reduced.

18. A partial diffuser for reducing pressure in a pathway, the pathway having a flow path for conveying a fluid, the pathway having an inside wall defining the flow path, the partial diffuser comprising:

a plate mounted to the inside wall and projecting transversely into the flow path, the plate having a wall side proximate to the inside wall and an opposing side distal to the inside wall, the plate having a large hole proximate to the wall side and a small hole proximate to the opposing side, wherein the large hole has a greater cross-sectional area than the small hole.

19. A flow control valve, comprising:

a valve body having an inlet and an outlet;

a valve element disposed within said valve body between said inlet and said outlet, said valve body and said valve element having a passageway therethrough, wherein said passageway in the valve element is selectively alignable with said passageway in the valve body, said passageway being defined by an inside wall; and a partial diffuser disposed in said passageway and secured to said inside wall, wherein said partial diffuser divides said passageway into an unrestricted flow region and a restricted flow region, said restricted flow region being divided into a lesser restricted flow region and a greater restricted flow region, wherein said lesser restricted flow region is proximate to said inside wall and said greater restricted flow region is distal to said inside wall, so that said lesser restricted flow region lies between said greater restricted flow region and said inside wall.

20. The flow control valve of claim 16, wherein said partial diffuser is an inlet flow diffuser mounted in said inlet proximate to said valve element.

21. The flow control valve of claim 16 wherein said partial diffuser is a valve element diffuser mounted in said valve element.

22. The flow control valve of claim 17 further comprising a valve element inlet flow diffuser mounted in an inlet to said valve element, wherein said valve element inlet flow diffuser is mounted diametrically opposed to said inlet flow diffuser.

23. The flow control valve of claim 19 further comprising a valve element outlet flow diffuser mounted in an outlet from said valve element, wherein said valve element outlet flow diffuser is disposed diametrically opposed to said valve element inlet flow diffuser.

* * * * *